US009609491B2

(12) United States Patent
Kashiwase (10) Patent No.: US 9,609,491 B2
(45) Date of Patent: Mar. 28, 2017

(54) SERVER APPARATUS, COMMUNICATION APPARATUS, AND COMMUNICATION METHOD

(71) Applicant: KYOCERA CORPORATION, Kyoto (JP)

(72) Inventor: Susumu Kashiwase, Machida (JP)

(73) Assignee: KYOCERA Corporation, Kyogo (JP)

( * ) Notice: Subject to any disclaimer, the term of this patent is extended or adjusted under 35 U.S.C. 154(b) by 0 days.

(21) Appl. No.: 15/230,778

(22) Filed: Aug. 8, 2016

(65) Prior Publication Data

US 2016/0345142 A1    Nov. 24, 2016

Related U.S. Application Data

(63) Continuation of application No. PCT/JP2015/054120, filed on Feb. 16, 2015.

(30) Foreign Application Priority Data

Feb. 18, 2014 (JP) ................................ 2014-028536

(51) Int. Cl.
*H04B 7/00* (2006.01)
*H04W 4/10* (2009.01)
(Continued)

(52) U.S. Cl.
CPC .............. *H04W 4/10* (2013.01); *H04L 67/26* (2013.01); *H04L 67/303* (2013.01); *H04M 3/56* (2013.01);
(Continued)

(58) Field of Classification Search
CPC ....... H04W 4/10; H04W 8/005; H04W 76/02; H04W 88/04; H04M 3/56; H04L 67/26; H04L 67/303
(Continued)

(56) References Cited

U.S. PATENT DOCUMENTS 8,055,290 B1 * 11/2011 Cai ..................... H04W 76/005
455/518
8,744,509 B2    6/2014 Shuman et al.
(Continued)

FOREIGN PATENT DOCUMENTS

JP       5230840 B2      7/2013

OTHER PUBLICATIONS

International Search Report issued in PCT/JP2015/054120; mailed Jul. 4, 2015.
(Continued)

*Primary Examiner* — Dominic Rego
(74) *Attorney, Agent, or Firm* — Studebaker & Brackett PC (57) ABSTRACT

A server apparatus, a communication apparatus, and a communication method are disclosed. Communication terminals forming a group are capable of performing push-to-talk group communication through the server apparatus. In reception of a call setting request from a first communication terminal of the group by the receiver, when the group includes a second communication terminal to which call setting fails, the transmitter transmits, to a communication terminal of the group, an instruction to execute a discovery processing of discovering a communication partner terminal capable of performing a direct communication with the communication terminal without passing through the server apparatus. When a result of the discovery processing reveals that a third communication terminal that has received the instruction from the server apparatus is capable of performing the direct communication with the second communication terminal, call setting between the server apparatus and the second communication terminal is performed through the third communication terminal.

8 Claims, 8 Drawing Sheets

(51) Int. Cl.
*H04W 8/00* (2009.01)
*H04W 76/02* (2009.01)
*H04M 3/56* (2006.01)
*H04L 29/08* (2006.01)
*H04W 88/04* (2009.01)

(52) U.S. Cl.
CPC .......... *H04W 8/005* (2013.01); *H04W 76/02* (2013.01); *H04W 88/04* (2013.01)

(58) Field of Classification Search
USPC ....... 455/517–520, 553.1, 90.2, 78, 79, 500, 455/426.1, 412.1, 414.1, 416, 420; 370/352, 389, 338, 328
See application file for complete search history.

(56) References Cited

U.S. PATENT DOCUMENTS

| | | | | |
|---|---|---|---|---|
| 2005/0041617 | A1* | 2/2005 | Huotari | H04L 12/5695 370/328 |
| 2005/0276268 | A1* | 12/2005 | Poikselka | H04M 3/42008 370/395.2 |
| 2005/0288049 | A1* | 12/2005 | Gill | H04W 76/005 455/518 |
| 2006/0031294 | A1* | 2/2006 | Poikselka | H04W 76/005 709/204 |
| 2006/0046760 | A1* | 3/2006 | Bertino | H04W 60/02 455/519 |
| 2006/0116149 | A1* | 6/2006 | Dunn | H04W 72/005 455/518 |
| 2006/0153102 | A1* | 7/2006 | Kuure | H04Q 3/0016 370/263 |
| 2007/0010275 | A1* | 1/2007 | Kiss | H04M 3/42374 455/521 |
| 2007/0021131 | A1* | 1/2007 | Laumen | H04M 3/42221 455/518 |
| 2007/0094409 | A1* | 4/2007 | Crockett | H04L 29/06 709/233 |
| 2007/0197250 | A1* | 8/2007 | Kies | H04W 84/18 455/518 |
| 2008/0039065 | A1* | 2/2008 | Schmidt | H04W 4/10 455/422.1 |
| 2009/0054011 | A1* | 2/2009 | Shibuya | H04W 72/005 455/90.2 |
| 2009/0313252 | A1* | 12/2009 | Gupta | G06F 17/30348 |
| 2010/0011122 | A1* | 1/2010 | Rosen | H04W 4/10 709/239 |
| 2010/0016008 | A1* | 1/2010 | Brewer | H04W 4/10 455/518 |
| 2010/0325289 | A1* | 12/2010 | Dostal | H04L 12/1818 709/227 |
| 2011/0053554 | A1* | 3/2011 | Wong | H04M 15/00 455/406 |
| 2013/0109425 | A1* | 5/2013 | Kerger | H04L 65/4061 455/518 |
| 2015/0223110 | A1* | 8/2015 | Lindner | H04L 65/4061 455/518 |

OTHER PUBLICATIONS

Written Opinion issued in PCT/JP2015/054120; mailed Jul. 4, 2015; with a Statement of Relevance of Non-English References Pursuant to 37 CFR 1.98(a)(3)(i).

* cited by examiner

SERVER APPARATUS, COMMUNICATION APPARATUS, AND COMMUNICATION METHOD

CROSS-REFERENCE TO RELATED APPLICATION

The present application is a continuation of International Application No. PCT/JP2015/054120, filed on Feb. 16, 2015, which claims the benefit of Japanese Patent Application No. 2014-028536, filed on Feb. 18, 2014. Both International Application No. PCT/JP2015/054120 and Japanese Patent Application No. 2014-028536 are entitled "COMMUNICATION SYSTEM, SERVER DEVICE, COMMUNICATION DEVICE, AND COMMUNICATION METHOD". The content of these applications is incorporated herein by reference in their entirety.

FIELD

Embodiments of the present disclosure relate to communication techniques.

BACKGROUND

Various techniques have conventionally been proposed for communication techniques. There is a technique related to a push-to-talk (PTT) group communication. Push-to-talk using a cellular system is particularly referred to as "push-to-talk over cellular (PoC)".

SUMMARY

A server apparatus, a communication apparatus, and a communication method are disclosed. In one embodiment, a server apparatus controls a communication terminal and comprises a receiver and a transmitter. A plurality of communication terminals forming a group are capable of performing a push-to-talk group communication through the server apparatus. In reception of a call setting request from a first communication terminal included in the group by the receiver, when the group includes a second communication terminal to which call setting fails, the transmitter transmits, to a communication terminal included in the group, an instruction to execute a discovery processing of discovering a communication partner terminal capable of performing a direct communication with the communication terminal without passing through the server apparatus. When a result of the discovery processing reveals that a third communication terminal that has received the instruction from the server apparatus is capable of performing the direct communication with the second communication terminal, call setting between the server apparatus and the second communication terminal is performed through the third communication terminal.

In one embodiment, a communication apparatus is a communication terminal of a plurality of communication terminals that communicate with a server apparatus, and comprises a transmitter and a receiver. The communication apparatus forms, together with another communication terminal, a group capable of performing a push-to-talk group communication through the server apparatus. In transmission of a call setting request to the server apparatus from the transmitter, when the group includes a second communication terminal to which call setting fails, the server apparatus transmits, to a communication terminal included in the group, an instruction to execute a discovery processing of discovering a communication partner terminal capable of performing a direct communication with the communication terminal without passing through the server apparatus. When a result of the discovery processing reveals that the communication apparatus in which the receiver has received the instruction from the server apparatus is capable of performing the direct communication with the second communication terminal, call setting between the server apparatus and the second communication terminal is performed through the communication apparatus.

In one embodiment, a communication apparatus is a communication terminal of a plurality of communication terminals that communicate with a server apparatus, and comprises a transmitter and a receiver. The communication apparatus forms, together with another communication terminal, a group capable of performing a push-to-talk group communication through the server apparatus. In transmission of a call setting request to the server apparatus from the transmitter, when the group includes a first communication terminal to which call setting fails, the server apparatus notifies the communication apparatus that the group includes a communication terminal to which call setting fails. The communication apparatus further comprises a determination unit that determines, when the server apparatus notifies the receiver that the group includes the communication terminal to which call setting fails, to provide a communication terminal included in the group with an instruction to execute a discovery processing of discovering a communication partner terminal capable of performing a direct communication with the communication terminal without passing through the server apparatus. When the determination unit determines the instruction, the server apparatus provides the communication terminal included in the group with the instruction. When a result of the discovery processing reveals that a second communication terminal that has received the instruction from the server apparatus is capable of performing the direct communication with the first communication terminal, call setting between the server apparatus and the first communication terminal is performed through the second communication terminal.

In one embodiment, a communication apparatus is a communication terminal of a plurality of communication terminals that communicate with a server apparatus, and comprises a transmitter and a receiver. The communication apparatus forms, together with another communication terminal, a group capable of performing a push-to-talk group communication through the server apparatus. In transmission of a call setting request to the server apparatus from a first communication terminal included in the group, when call setting to the communication apparatus fails, the server apparatus transmits, to a communication terminal included in the group, an instruction to execute a discovery processing of discovering a communication partner terminal capable of performing a direct communication with the communication terminal without passing through the server apparatus. When a result of the discovery processing reveals that a second communication terminal that has received the instruction from the server apparatus is capable of performing the direct communication with the communication apparatus, call setting between the server apparatus and the communication apparatus is performed through the second communication terminal.

In one embodiment, a communication method, which is for use in a push-to-talk group communication by a plurality of communication terminals forming a group through a server apparatus, comprises: (a) transmitting a call setting request by a first communication terminal included in the group; (b) after the step (a), when the group includes a second communication terminal to which call setting fails, receiving, by a third communication terminal included in the group, from the server apparatus an instruction to execute a discovery processing of discovering a communication terminal capable of performing a direct communication with the third communication terminal without passing through the server apparatus; and (c) when a result of the discovery processing reveals that the third communication terminal that has received the instruction is capable of performing the direct communication with the second communication terminal, performing call setting between the server apparatus and the second communication terminal through the third communication terminal.

DETAILED DESCRIPTION

Figure 1:
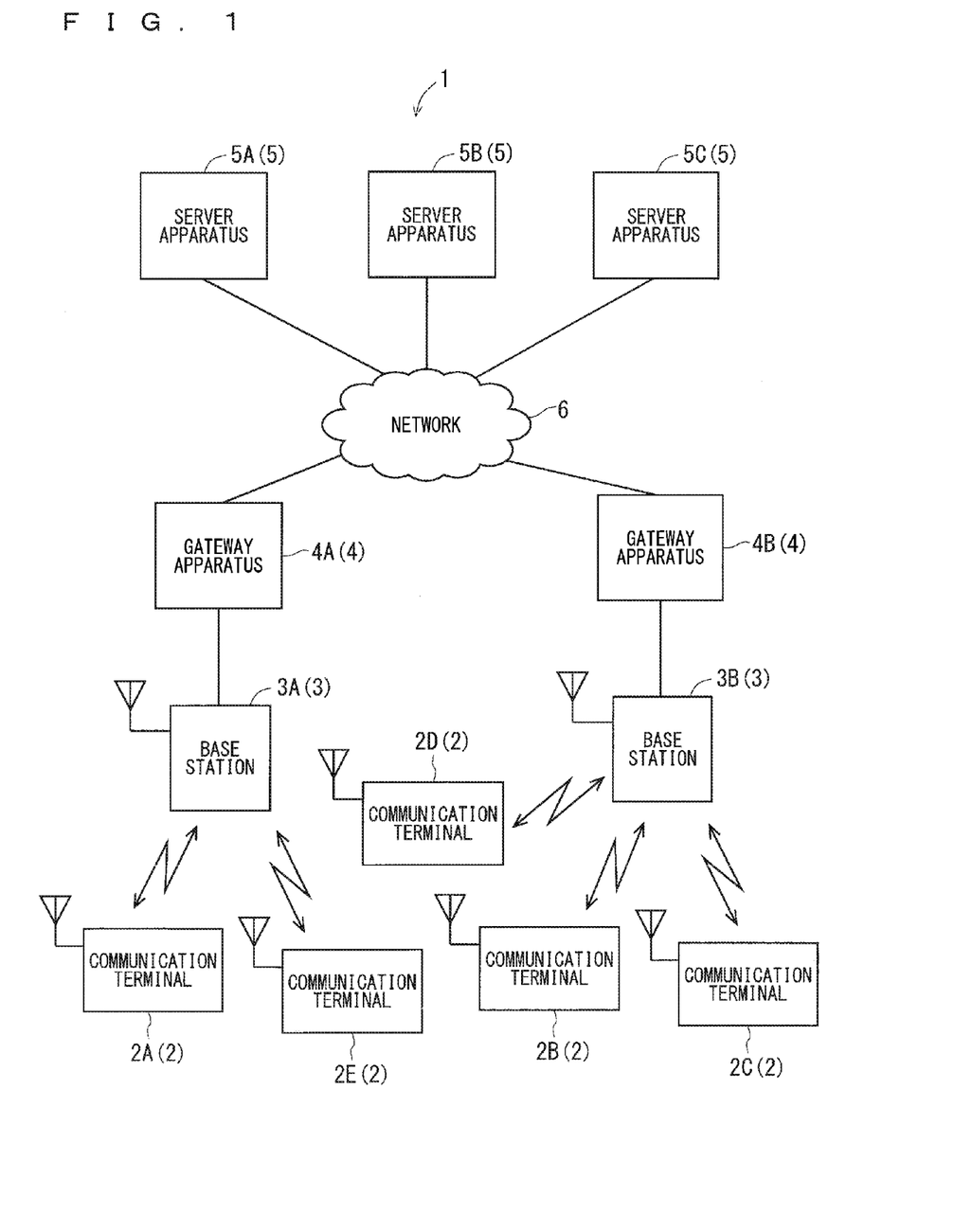
FIG. 1 illustrates the configuration of a communication system.

FIG. 1 illustrates the configuration of a communication system 1 according to an embodiment. The communication system 1 is, for example, a communication system including an E-UTRAN defined by the 3rd Generation Partnership Project (3GPP).

As illustrated in FIG. 1, the communication system 1 includes a plurality of communication terminals 2, a plurality of base stations 3, a plurality of gateway apparatuses 4, and a plurality of server apparatuses 5. FIG. 1 illustrates, as an example, five communication terminals 2A to 2D, two base stations 3A and 3B, two gateway apparatuses 4A and 4B, and three server apparatuses 5A to 5C. In the 3GPP, the communication terminal 2 is referred to as a "user equipment (UE)", the base station 3 is referred to as an "E-UTRAN NodeB (eNB)", and the gateway apparatus 4 is referred to as a "serving gateway (S-GW)". In the 3GPP, a network formed of a plurality of eNBs is referred to as an E-UTRAN.

The communication terminals 2 are, for example, mobile telephones such as smartphones, or tablets. The base station 3 can perform a wireless communication with the communication terminals 2 and also perform a wired communication with the gateway apparatus 4. The base station 3 may also perform a wireless communication with the gateway apparatus 4. The gateway apparatuses 4 and the server apparatuses 5 are connected to a network 6 such as the Internet. The communication terminal 2 can communicate with another communication terminal 2 through the base station 3 and the gateway apparatus 4 or through the base station 3, the gateway apparatus 4, and the server apparatus 5. In the example of FIG. 1, the base station 3A communicates with the communication terminals 2A and 2E, and the base station 3B communicates with the communication terminals 2B, 2C, and 2D. The base station 3A communicates with the gateway apparatus 4A, and the base station 3B communicates with the gateway apparatus 4B.

In one embodiment, the communication terminal 2 can perform a push-to-talk communication with another communication terminal 2. Specifically, the communication terminal 2 can perform a push-to-talk over cellular (PoC) communication with another communication terminal 2. In one embodiment, the plurality of communication terminals 2 can also perform a push-to-talk (specifically, PoC) group communication. Each server apparatus 5 is a server apparatus for push-to-talk. The server apparatus 5 is provided per user such as a company that utilizes push-to-talk. For example, the server apparatus 5A is a server apparatus for bus company, the server apparatus 5B is a service apparatus for police agency, and the server apparatus 5C is a server apparatus for fire agency. The server apparatuses 5B and 5C can be regarded as server apparatuses for public-safety push-to-talk. The server apparatus 5 may be used for services other than push-to-talk.

Figure 2:
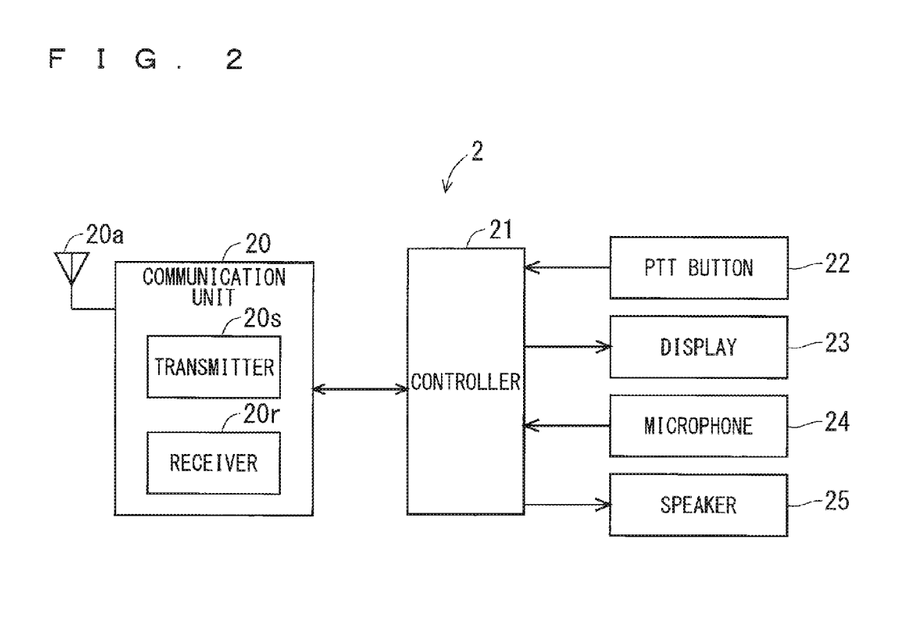
FIG. 2 illustrates the configuration of a communication terminal.

FIG. 2 illustrates the configuration of the communication terminal 2. As illustrated in FIG. 2, the communication terminal 2 includes a communication unit 20, a controller 21, a button for push-to-talk 22 (hereinafter referred to as a "PTT button 22"), a display 23, a microphone 24, and a speaker 25. The communication terminal 2 further includes a battery (not shown) and an imager (not shown).

The communication unit 20 includes a transmitter $20s$ and a receiver $20r$ that share an antenna $20a$ and can wirelessly communicate with the base station 3 using the antenna $20a$. The receiver $20r$ can perform, for example, amplification and down-conversion on a reception signal received by the antenna $20a$ and output a resultant signal to the controller 21. The transmitter $20s$ can perform, for example, up-conversion and amplification on a transmission signal input from the controller 21 and input a resultant signal to the antenna $20a$. Consequently, a radio signal is transmitted through the antenna $20a$.

The controller 21 may include at least one processor for providing control and processing capability to perform various functions as described in further detail below. In accordance with various embodiments, the at least one processor may be implemented as a single integrated circuit (IC) or as multiple communicatively coupled IC's and/or discrete circuits. It is appreciated that the at least one processor can be implemented in accordance with various known technologies.

In one embodiment, the processor includes one or more circuits or units configurable to perform one or more data computing procedures or processes. For example, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In one embodiment, the controller 21 comprises a central processing unit (CPU) that is a processor of one type and a memory. The controller 21 can perform, for example, demodulation on a reception signal input from the communication unit 20 to acquire data included in the reception signal. The controller 21 can control, for example, the display 23 based on the acquired data to perform various operations. The controller 21 can also generate a transmission signal including various types of data and output the transmission signal to the communication unit 20. The data generated by the controller 21 is thus transmitted from the transmitter 20s of the communication unit 20. The controller 21 can also detect a manipulation performed on the PTT button 22.

The PTT button 22 is manipulated by the user of the communication terminal 2 in a push-to-talk communication. The user can talk while pushing the PTT button 22 to transmit his/her own voice to a calling party. That is to say, in a push-to-talk communication (call) among a plurality of communication terminals 2, the communication terminal 2 whose PTT button 22 is being pushed has the floor.

The display 23 is, for example, a liquid crystal display and can display various types of information such as characters and graphics. The microphone 24 can convert the sound input from the outside of the communication terminal 2 into an electrical sound signal and output the electrical sound signal to the controller 21. The speaker 25 can convert the electrical sound signal generated by the controller 21 into a sound and output the sound.

Figure 3:
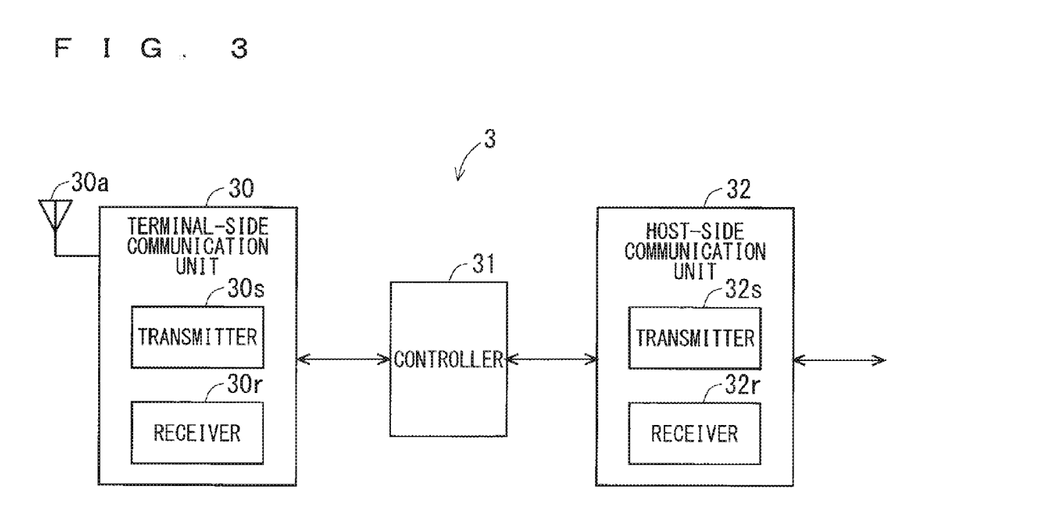
FIG. 3 illustrates the configuration of a base station.

FIG. 3 illustrates the configuration of the base station 3. As illustrated in FIG. 3 the base station 3 includes a terminal-side communication unit 30, a controller 31, and a host-side communication unit 32. The terminal-side communication unit 30 can perform a wireless communication with the communication terminal 2, and the host-side communication unit 32 can perform a wired communication with the gateway apparatus 4.

The terminal-side communication unit 30 includes a transmitter 30s and a receiver 30r that share an antenna 30a and can wirelessly communicate with the communication terminal 2 using the antenna 30a. The receiver 30r can perform, for example, amplification and down-conversion on a reception signal received by the antenna 30a and output a resultant signal to the controller 31. The transmitter 30s can perform, for example, up-conversion and amplification on a transmission signal input from the controller 31 and input a resultant signal to the antenna 30a.

The host-side communication unit 32 includes a transmitter 32s and a receiver 32r. The receiver 32r can acquire data from a reception signal from the gateway apparatus 4 and output the acquired data to the controller 31. The transmitter 32s can generate a transmission signal including the data generated by the controller 31 and transmit the transmission signal to the gateway apparatus 4.

The controller 31 may include at least one processor for providing control and processing capability to perform various functions as described in further detail below. In accordance with various embodiments, the at least one processor may be implemented as a single integrated circuit (IC) or as multiple communicatively coupled IC's and/or discrete circuits. It is appreciated that the at least one processor can be implemented in accordance with various known technologies.

In one embodiment, the processor includes one or more circuits or units configurable to perform one or more data computing procedures or processes. For example, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In one embodiment, the controller 31 comprises a CPU that is a processor of one type and a memory. The controller 31 can perform, for example, demodulation on a reception signal input from the terminal-side communication unit 30 to acquire data included in the reception signal. The controller 31 can perform various operations such as controlling the host-side communication unit 32 based on the acquired data. The controller 31 can also generate a transmission signal including various types of data and output the transmission signal to the terminal-side communication unit 30. The data generated by the controller 31 is thus transmitted from the transmitter 30s of the terminal-side communication unit 30.

The controller 31 can perform various operations such as controlling the terminal-side communication unit 30 based on the data from the host-side communication unit 32. The controller 31 can generate various types of data and output them to the host-side communication unit 32. The data generated by the controller 31 is thus transmitted from the transmitter 32s of the host-side communication unit 32.

Figure 4:
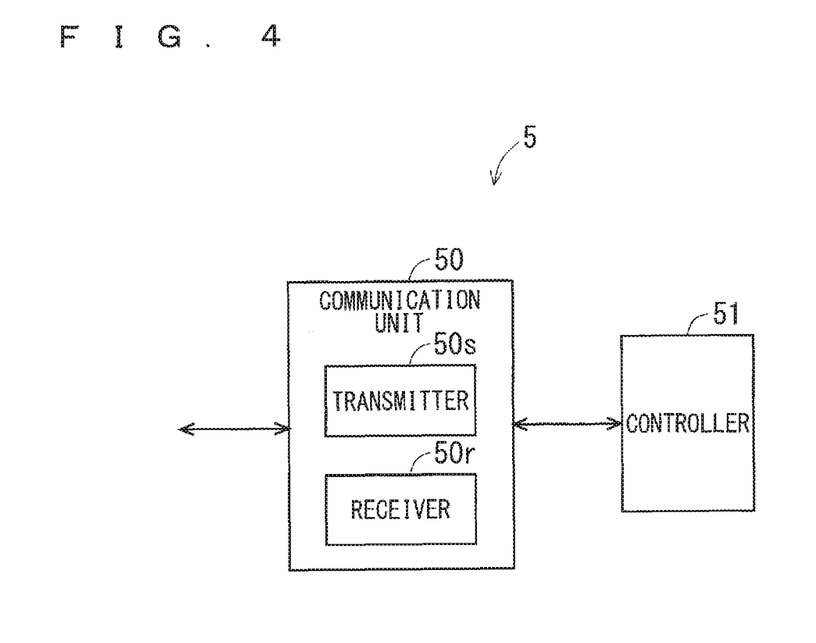
FIG. 4 illustrates the configuration of a server apparatus.

FIG. 4 illustrates the configuration of the server apparatus 5. The server apparatus 5 has a configuration similar to that of a general-purpose computer. As illustrated in FIG. 4, the server apparatus 5 includes a communication unit 50 and a controller 51. The communication unit 50 includes a transmitter 50s and a receiver 50r and is connected to the network 6. The receiver 50r can receive data from the network 6 and transmit the data to the controller 51. The transmitter 50s can transmit the data generated by the controller 51 to the network 6.

The controller 51 may include at least one processor for providing control and processing capability to perform various functions as described in further detail below. In accordance with various embodiments, the at least one processor may be implemented as a single integrated circuit (IC) or as multiple communicatively coupled IC's and/or discrete circuits. It is appreciated that the at least one processor can be implemented in accordance with various known technologies.

In one embodiment, the processor includes one or more circuits or units configurable to perform one or more data computing procedures or processes. For example, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In one embodiment, the controller 51 comprises a CPU that is a processor of one type and a memory. The controller 51 can perform various operations based on the data from the receiver 50r. The controller 51 can also generate transmission data and input the transmission data to the transmitter 50s.

The server apparatus 5 can communicate with the gateway apparatus 4 through the network 6. The gateway apparatus 4 has a configuration similar to that of the server apparatus 5 and includes a communication unit and a controller.

In the communication system 1 having the configuration as described above, in a communication (call) by the telephone functions between two communication terminals 2, the two communication terminals 2 communicate with each other through the base station 3 and the gateway apparatus 4.

For example, in the example of FIG. 1, in a communication by the telephone functions between the communication terminal 2A located within the service area (communication area) of the base station 3A and the communication terminal 2C located within the service area of the base station 3B, the communication terminal 2A and the communication terminal 2C communicate with each other through the base station 3A, the gateway apparatus 4A connected to the base station 3A, the gateway apparatus 4B connected to the gateway apparatus 4A via the network 6, and the base station 3B connected to the gateway apparatus 4B.

In a push-to-talk communication (call) between a plurality of communication terminals 2, meanwhile, the plurality of communication terminals 2 communicate with each other through the base station 3, the gateway apparatus 4, and the server apparatus 5.

In the example of FIG. 1, for example, in a push-to-talk individual communication (one-to-one communication) between the communication terminal 2A and the communication terminal 2C, when the communication terminal 2A has the floor, the data (voice data) transmitted from the communication terminal 2A is input to the server apparatus 5 through the base station 3A and the gateway apparatus 4A. The server apparatus 5 transmits the input data to the communication terminal 2C through the gateway apparatus 4B and the base station 3B.

Considered here is a case in which the communication terminal 2A, the communication terminal 2B, and the communication terminal 2E form one group in push-to-talk in the example of FIG. 1. In this case, when the communication terminal 2A has the floor, the data (voice data) transmitted from the communication terminal 2A is input to the server apparatus 5 through the base station 3A and the gateway apparatus 4A. The server apparatus 5 then transmits the input data to the communication terminal 2B through the gateway apparatus 4B and the base station 3B and also to the communication terminal 2E through the gateway apparatus 4A and the base station 3A.

As described above, in a push-to-talk group communication, the data transmitted from the communication terminal 2 having the floor is input to the server apparatus 5 once, and then, the data is broadcast from the server apparatus 5 to the other communication terminals 2 in the group.

When one group in which a push-to-talk group communication is performed is formed by two communication terminals 2, the group communication in this group is similar to an individual communication.

Hereinafter, the communication terminal 2 having the floor, that is, the communication terminal 2 that transmits voice data in a push-to-talk communication is referred to as an "originating terminal 2". The communication terminal 2 not having the floor, that is, the communication terminal 2 that receives voice data in a push-to-talk communication is referred to as a "target terminal 2". One group in which a push-to-talk group communication is performed is referred to as a "PTT group".

<Direct Communication between Communication Terminals>

In one embodiment, with another communication terminal 2 in its vicinity, the communication terminal 2 is capable of performing a direct communication with the other communication terminal 2 without passing through the base station 3 and the gateway apparatus 4. The direct communication between communication terminals 2 is referred to as "Device to Device (D2D)". In the 3GPP, D2D is defined as a "direct ode" of the "Proximity Services (ProSe) communication".

<Push-to-Talk Communication>

In a push-to-talk individual communication and a push-to-talk group communication, the originating terminal 2 transmits a call setting request for call setting between the server apparatus 5 and the target terminal 2. Upon completion of the call setting between the server apparatus 5 and the target terminal 2, a push-to-talk communication is enabled between the originating terminal 2 and the target terminal 2.

Figure 5:
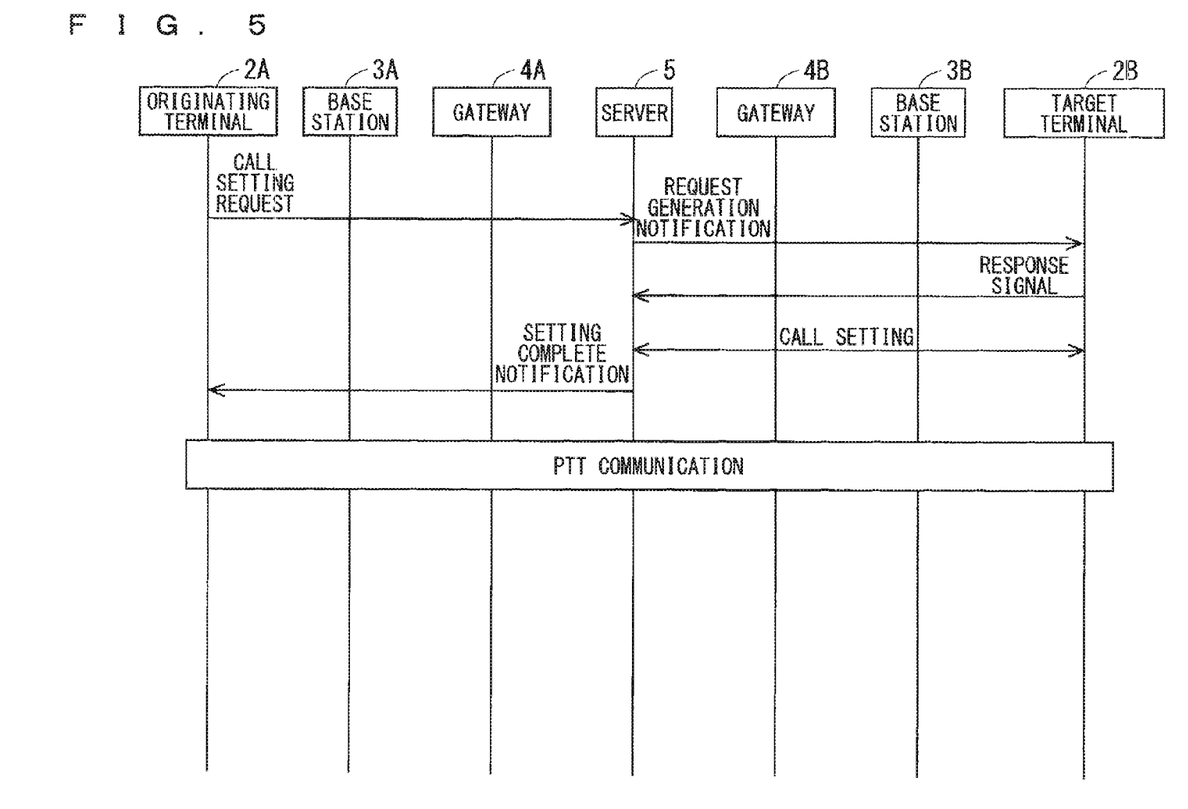
FIG. 5 illustrates the operation of the communication system.

FIG. 5 illustrates the operation of the communication system 1, where the communication terminal 2A is an originating terminal 2A and the communication terminal 2B is a target terminal 2B. When the PTT button 22 is being pushed, the communication terminal 2A serves as an originating terminal 2A and, as illustrated in FIG. 5, transmits a call setting request. The server apparatus 5 receives, through the base station 3A and the gateway apparatus 4A, the call setting request transmitted from the originating terminal 2A. When receiving the call setting request, the server apparatus 5 transmits a request generation notification for notifying that a call setting request has been generated. The request generation notification from the server apparatus 5 is transmitted to the target terminal 2B through the gateway apparatus 4B and the base station 3B.

The target terminal 2B that has received the request generation notification transmits a response signal. The response signal is transmitted to the server apparatus 5 through the base station 3B and the gateway apparatus 4B. When receiving the response signal from the target terminal 2B, the server apparatus 5 judges that a communication with the target terminal 2B is enabled. The server apparatus 5 then exchanges necessary information with the target terminal 2B to perform call setting between the target terminal 2B and itself.

Upon completion of the call setting between the target terminal 2B and itself, the server apparatus 5 transmits a setting complete notification. The setting complete notification is transmitted to the originating terminal 2A through the gateway apparatus 4A and the base station 3A. When the originating terminal 2A receives the setting complete notification for the target terminal 2B, the originating terminal 2A and the target terminal 2B perform a PTT communication, so that voice data from the originating terminal 2A is received by the target terminal 2B through the base station 3A, the gateway apparatus 4A, the server apparatus 5, the gateway apparatus 4B, and the base station 3B.

In the communication system 1, when a PTT group including the communication terminals 2A and 2B performs a push-to-talk group communication and the PTT group includes another target terminal 2 except for the target terminal 2B, the server apparatus 5 also transmits a request generation notification to the other target terminal 2 in response to the call setting request from the originating terminal 2A. The other target terminal 2 operates similarly to the target terminal 2B, so that call setting is performed between the server apparatus 5 and the other target terminal 2. This enables a push-to-talk group communication in a PIT group including the communication terminals 2A and 2B and the other communication terminal 2.

Herein, when a plurality of communication terminals 2 forming a PTT group perform a push-to-talk group communication, if call setting cannot be performed to a target terminal 2 included in the PTT group because, for example, the target terminal 2 is located out of the service area of each base station 3, a group communication may be difficult for the target terminal 2.

In one embodiment, thus, even when a PTT group includes a target terminal 2 to which call setting has failed, the target terminal 2 to which call setting has failed can perform a push-to-talk group communication by discovering another target terminal 2 directly communicable with the target terminal 2 to which call setting has failed. This point will be described below in detail. In the following, a state in which the communication terminal 2 is located out of the service area of each base station 3, that is, a state in which the communication terminal 2 is located out of the coverage of a network (E-UTRAN) formed by a plurality of base stations 3 is referred to as being "out of range".

Figure 6:
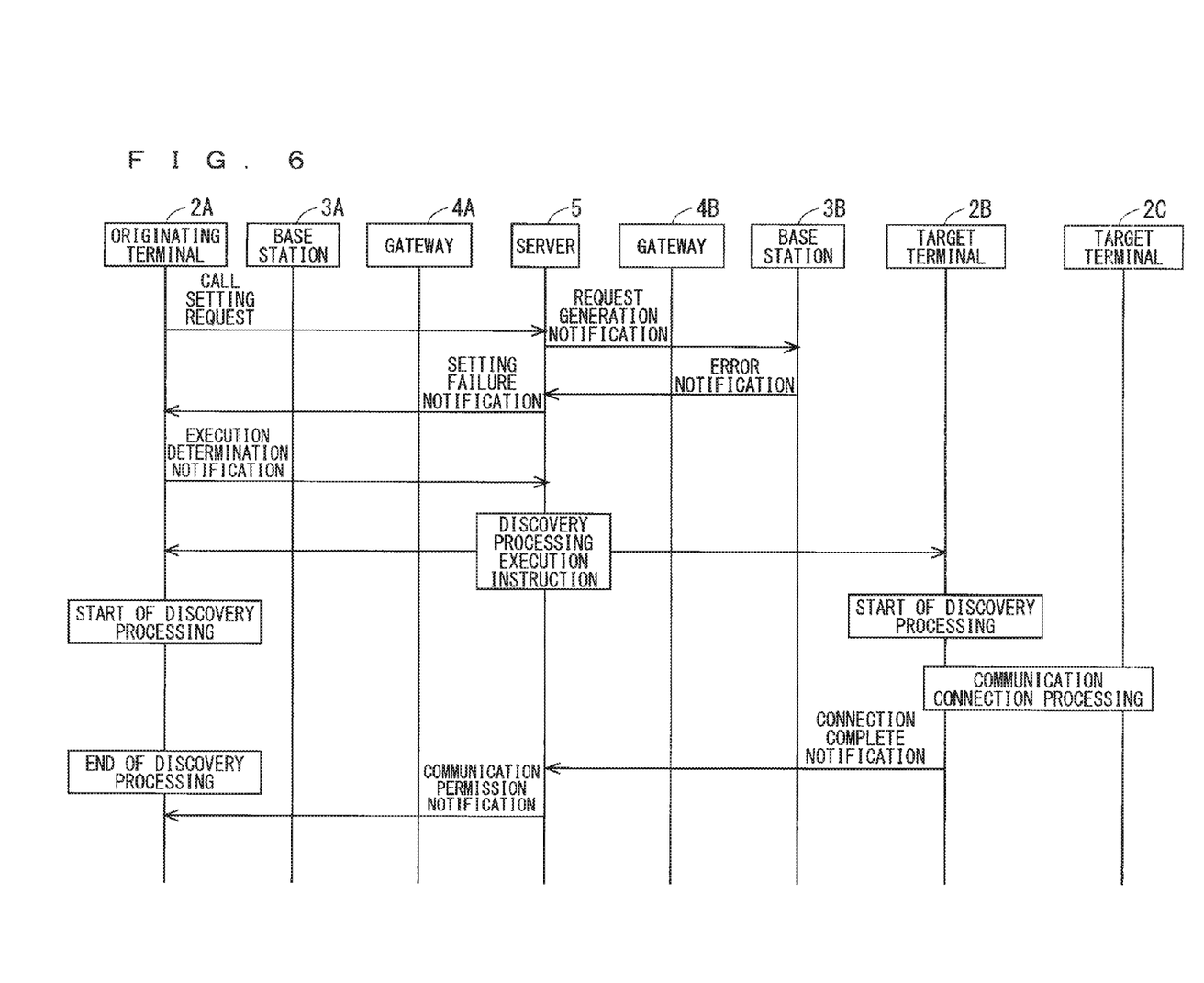
FIG. 6 illustrates the operation of the communication system.

FIG. 6 illustrates the operation of the communication system 1 when communication terminals 2A, 2B, and 2C forming a PTT group perform a push-to-talk group communication. In the example of FIG. 6, the communication terminal 2A is an originating terminal 2A, and the communication terminals 2B and 2C are target terminals 2B and 2C. In the example of FIG. 6, the communication terminal 2C has moved from the service area of the base station 3B to the outside of the service area to be an out-of-range communication terminal 2, and accordingly, the server apparatus 5 cannot communicate with the communication terminal 2C. The process for the target terminal 2B located within the service area of the base station 3B is similar to that of FIG. 5, and thus, the following will mainly describe the process related to the target terminal 2C. FIG. 6 mainly illustrates the process related to the target terminal 2C.

As illustrated in FIG. 6, the originating terminal 2A whose PTT button 22 is being pushed transmits a call setting request in a manner similar to the above. The call setting request is received by the server apparatus 5. When receiving the call setting request, the server apparatus 5 transmits a request generation notification. The request generation notification from the server apparatus 5 is received by the base station 3B through the gateway apparatus 4B.

When receiving the request generation notification, the base station 3B judges whether it can communicate with the target terminals 2B and 2C. Each base station 3 manages communicable communication terminals 2, that is, communication terminals 2 located within the service area, and thus, the base station 3B can judge whether it can communicate with the target terminals 2B and 2C. In this example, the target terminal 2B is located within the service area of the base station 3B and the target terminal 2C is an out-of-range communication terminal 2, and thus, the base station 3B can communicate with the target terminal 2B and cannot communicate with the target terminal 2C.

The base station 3B transmits an error notification indicating that it cannot communicate with the target terminal 2C while transmitting the received request generation notification to the target terminal 2B communicable therewith. The error notification is received by the server apparatus 5 through the gateway apparatus 4B. When receiving the error notification, the server apparatus 5 transmits a setting failure notification for notifying that call setting between the target terminal 2C and itself has failed. The setting failure notification is received by the originating terminal 2A through the gateway apparatus 4A and the base station 3A.

When receiving the setting failure notification, that is, when being notified by the server apparatus 5 that the PTT group includes a target terminal 2 to which call setting cannot be performed, the originating terminal 2A determines to provide the communication terminal 2 included in the PTT group with an instruction to execute a discovery processing of discovering a communication partner terminal 2 capable of performing a direct communication with the communication terminal 2. This is determined by the controller 21. That is to say, the controller 21 functions as a determination unit that determines to provide the communication terminal 2 included in the PTT group with the instruction to execute the discovery processing of discovering a communication partner terminal 2 capable of performing a direct communication with the communication terminal 2. The originating terminal 2 then transmits an execution determination notification for notifying that it has determined to provide the communication terminal 2 of the PTT group with the instruction to execute the discovery processing. This discovery processing is referred to as "discovery" in "ProSe Communication" in the 3GPP.

The execution determination notification transmitted from the originating terminal 2A is received by the server apparatus 5 through the base station 3A and the gateway apparatus 4A. When receiving the execution determination notification, the server apparatus 5 transmits an instruction to execute the discovery processing (hereinafter also referred to as a "discovery processing execution instruction") to each of a plurality of communication terminals 2 forming a PTT group through the gateway apparatus 4 and the base station 3. In this example, the originating terminal 2A and the target terminal 2B of the PTT group can receive the discovery processing execution instruction, while the out-of-range target terminal 2C of the PTT group cannot receive the discovery processing execution instruction.

The communication terminal 2 that has received the discovery processing execution instruction starts the discovery processing of discovering a communication partner terminal 2 capable of performing a direct communication therewith. Specifically, the communication terminal 2 transmits a synchronization signal and checks whether to receive a response signal responding to the synchronization signal. The communication terminal 2 that has received the synchronization signal transmits a response signal. Hereinafter, the synchronization signal transmitted by the communication terminal 2 in the discovery processing is referred to as a "direct-communication synchronization signal". The direct-communication synchronization signal may be at least one of a "primary synchronization signal" and a "secondary synchronization signal" defined in the 3GPP. The former is referred to as "PSS", and the latter is referred to as "SSS".

When receiving no response signal from the out-of-range target terminal 2C until a predetermined time T1 elapses from the transmission of the direct-communication synchronization signal, the communication terminal 2 judges that it cannot perform a direct communication with the target terminal 2C and ends the discovery processing. The communication terminal 2 then notifies the server apparatus 5 through the base station 3 and the gateway apparatus 4 that the communication terminal 2 cannot perform a direct communication with the target terminal 2C.

Meanwhile, when receiving a response signal from the target terminal 2C until the predetermined time T1 elapses from the transmission of the direct-communication synchronization signal, the communication terminal 2 performs a communication connection processing for a direct communication between the target terminal 2C and itself. This enables a direct communication between the communication terminal 2 and the target terminal 2C. Upon completion of the communication connection processing for a direction communication between the target terminal 2C and itself, the communication terminal 2 that has received the discovery processing execution instruction transmits a connection complete notification for notifying of the completion to the server apparatus 5 through the base station 3 and the gateway apparatus 4.

Figure 7:
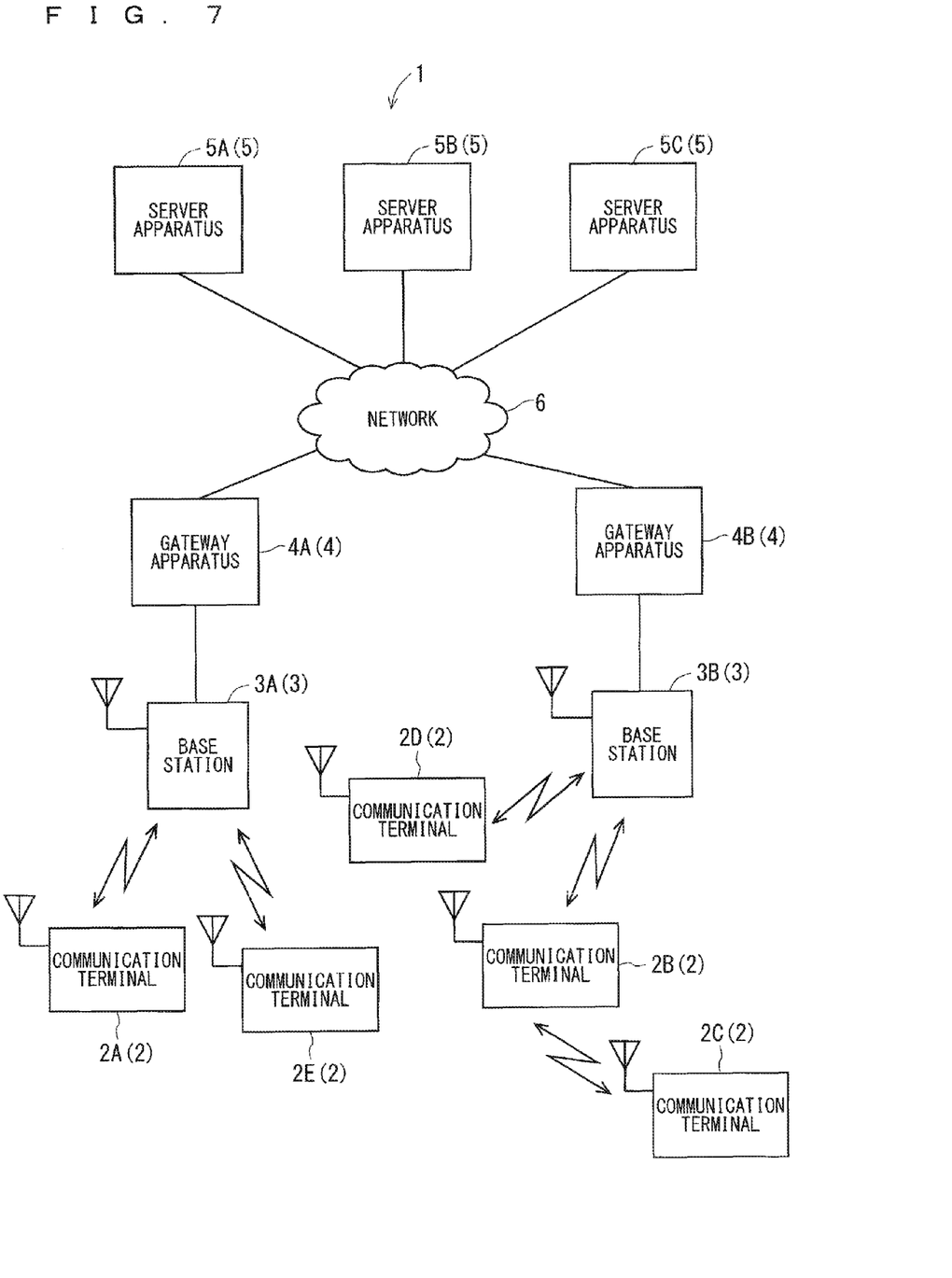
FIG. 7 illustrates the configuration of the communication system.

In this example, as illustrated in FIG. 7, the out-of-range target terminal 2C is located adjacent to the target terminal 2B and is not located adjacent to the originating terminal 2A. Thus, the target terminal 2B receives a response signal from the target terminal 2C until the predetermined time T1 elapses from the transmission of the direct-communication synchronization signal, and the originating terminal 2A receives no response signal from the target terminal 2C until the predetermined time T1 elapses from the transmission of the direct-communication synchronization signal. Consequently, the target terminal 2B can perform a direct communication with the target terminal 2C, and the originating terminal 2A cannot perform a direct communication with the target terminal 2C.

When receiving direct-communication synchronization signals from a plurality of communication terminals 2, the out-of-range target terminal 2C transmits a response signal to only the communication terminal 2 that transmits a direct-communication synchronization signal having the highest reception level.

When receiving a connection complete notification from the communication terminal 2 of the PTT group, the server apparatus 5 transmits, to the originating terminal 2A, a communication permission notification for notifying that a communication with the target terminal 2C is enabled. Meanwhile, when receiving a connection complete notification from no communication terminal 2 of the PTT group, the server apparatus 5 notifies the originating terminal 2A that a communication with the target terminal 2C is disabled.

When receiving the communication permission notification, the originating terminal 2A uses the display 23 or the like to notify the user of the originating terminal 2A that a communication with the target terminal 2C is enabled. When being notified that a communication with the target terminal 2C is disabled, the originating terminal 2A uses the display 23 or the like to notify the user of the originating terminal 2A that a communication with the target terminal 2C is disabled.

Figure 8:
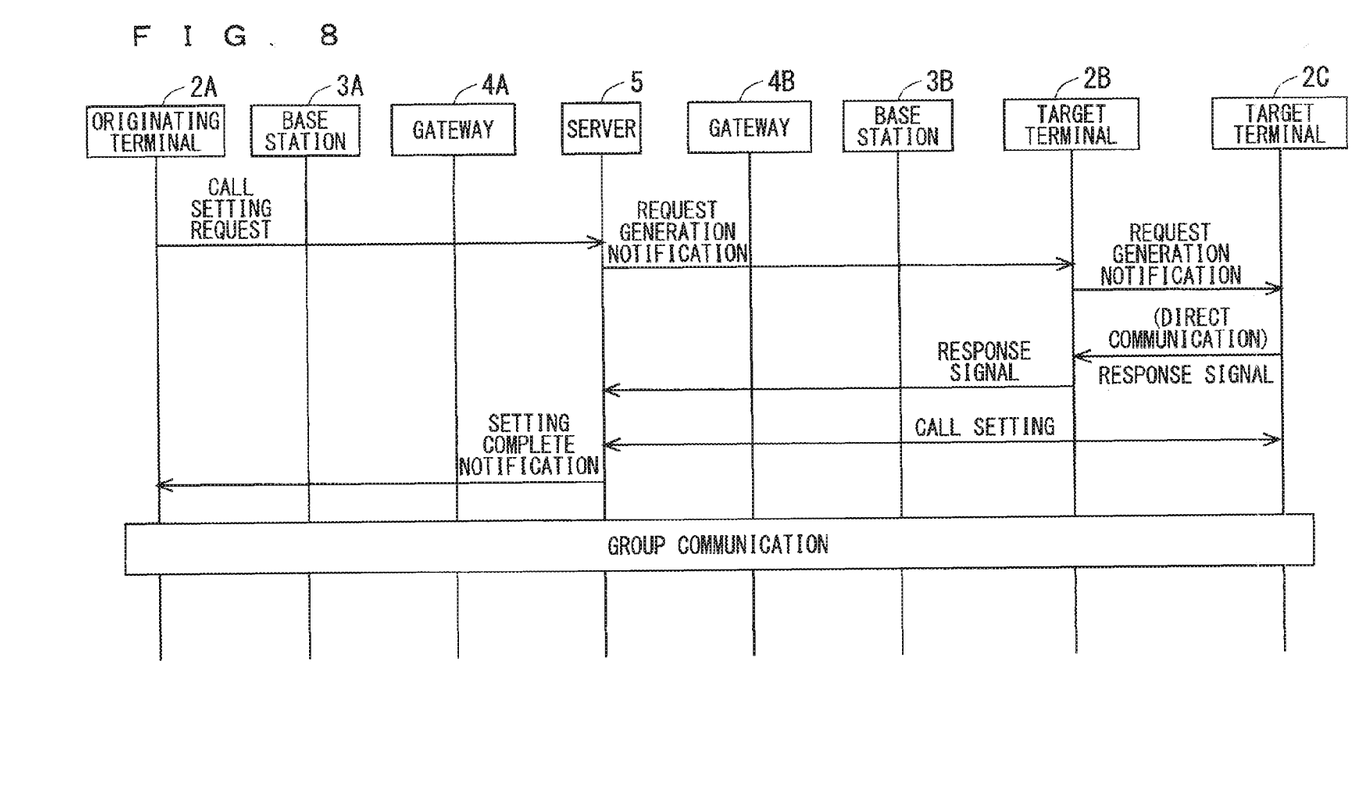
FIG. 8 illustrates the operation of the communication system.

After the reception of the communication permission notification by the originating terminal 2A, when the PTT button 22 is being pushed again, the originating terminal 2A transmits a call setting request as illustrated in FIG. 8. When receiving the call setting request transmitted from the originating terminal 2A, the server apparatus 5 transmits a request generation notification. The request generation notification from the server apparatus 5 is transmitted to the target terminal 2B located within the service area of the base station 3B through the gateway apparatus 4B and the base station 3B.

The target terminal 2B that has received the request generation notification transmits a response signal and also transmits the request generation notification to the out-of-range target terminal 2C through direct communication. The target terminal 2C that has received the request generation notification transmits a response signal to the target terminal 2B through direct communication. The target terminal 2B that has received the response signal from the target terminal 2C transmits the response signal to the server apparatus 5.

As described above, the target terminal 2B capable of performing a direct communication with the out-of-range target terminal 2C functions as a relay terminal that relays the data between the target terminal 2C and the server apparatus 5.

When receiving, from the target terminal 2B, the response signal transmitted from the target terminal 2C, the server apparatus 5 judges that a communication with the target terminal 2C is enabled. The server apparatus 5 then exchanges necessary information with the target terminal 2C to perform call setting between the target terminal 2C and itself. Upon completion of the call setting between the target terminal 2C and itself, the server apparatus 5 transmits a setting complete notification to the originating terminal 2A.

When the originating terminal 2A receives the setting complete notifications for the target terminal 2B and the target terminal 2C, a push-to-talk group communication is performed among the originating terminal 2A, the target terminal 2B, and the target terminal 2C. In this group communication, when receiving voice data from the originating terminal 2A, the server apparatus 5 transmits the voice data to the target terminal 2B. The target terminal 2B processes the received voice data (specifically, causes a voice to be output from the speaker 25 based on the voice data) and also transmits the voice data to the target terminal 2C through direct communication. The target terminal 2C processes the received voice data. Subsequently, when, for example, the communication terminal 2C serves as an originating terminal 2C and the communication terminals 2A and 2B serve as target terminals 2A and 2B in the group communication, the originating terminal 2C transmits voice data to the target terminal 2B through direct communication. The target terminal 2B transmits the received voice data to the server apparatus 5. The server apparatus 5 transmits the received voice data to the target terminals 2A and 2B. The target terminal 2A and the target terminal 2C each process the voice data received from the server apparatus 5.

When moving out of the service area of each base station 3 to be out of range, the communication terminal 2 may monitor direct-communication synchronization signals transmitted from other communication terminals 2 for a predetermined time T2 upon becoming out of range. That is to say, the communication terminal 2 may be configured to, when being out of range, receive direct-communication synchronization signals transmitted from other communication terminals 2 for the predetermined time T2 upon becoming out of range. The predetermined time T2 for the communication terminal 2 is, for example, an average value of intervals at which call setting requests for a group communication are generated in the PTT group including the relevant communication terminal 2.

In the example above, when the originating terminal 2A is located adjacent to the out-of-range target terminal 2C, the originating terminal 2A may serve as a relay terminal that relays data between the server apparatus 5 and the target terminal 2C.

As described above, in one embodiment, in the transmission of a call setting request to the server apparatus 5 from the originating terminal 2 included in the PTT group, when the PTT group includes a target terminal 2 to which call setting cannot be performed, the server apparatus 5 transmits, to a communication terminal 2 included in the PTT group, an instruction to execute the discovery processing of discovering a communication partner terminal capable of performing a direct communication with the communication terminal 2. Then, when the result of the discovery processing reveals that the communication terminal 2 that has received the instruction to execute the discovery processing from the server apparatus 5 can perform a direct communication with the target terminal 2 to which call setting has failed, call setting between the server apparatus 5 and the target terminal 2 is performed through the communication terminal 2 that has executed the discovery processing. Consequently, call setting can be performed to the target terminal 2 to which call setting has failed once, enabling a push-to-talk group communication in the PTT group including the target terminal 2. A plurality of communication terminals 2 forming a PTT group can thus perform a push-to-talk group communication more reliably even when the PTT group includes an out-of-range communication terminal 2.

In the example above, the server apparatus 5 transmits a discovery processing execution instruction to each communication terminal 2 included in the PTT group. Alternatively, the server apparatus 5 may transmit a discovery processing execution instruction to only the communication terminal 2 communicable with the base station 3 with which the out-of-range communication terminal 2 communicated last in the PTT group. In the example of FIG. 7, the server apparatus 5 may transmit a discovery processing execution instruction to only the communication terminal 2B communicable with the base station 3B with which the out-of-range communication terminal 2C communicated last in the PTT group. This can reduce a possibility that a communication terminal 2 far from an out-of-range communication terminal 2, that is, a communication terminal 2 that cannot perform a direct communication with the out-of-range communication terminal 2 will receive a discovery processing execution instruction. This can restrict the communication terminal 2 from uselessly executing the discovery processing. Each base station 3 manages communication terminals 2 communicable with itself in real time. Thus, by each base station 3 transmitting the management information on the communication terminals 2 communicable with itself to the server apparatus 5 as appropriate, the server apparatus 5 can identify the base station 3 with which the out-of-range communication terminal 2 communicated last.

Figure 9:
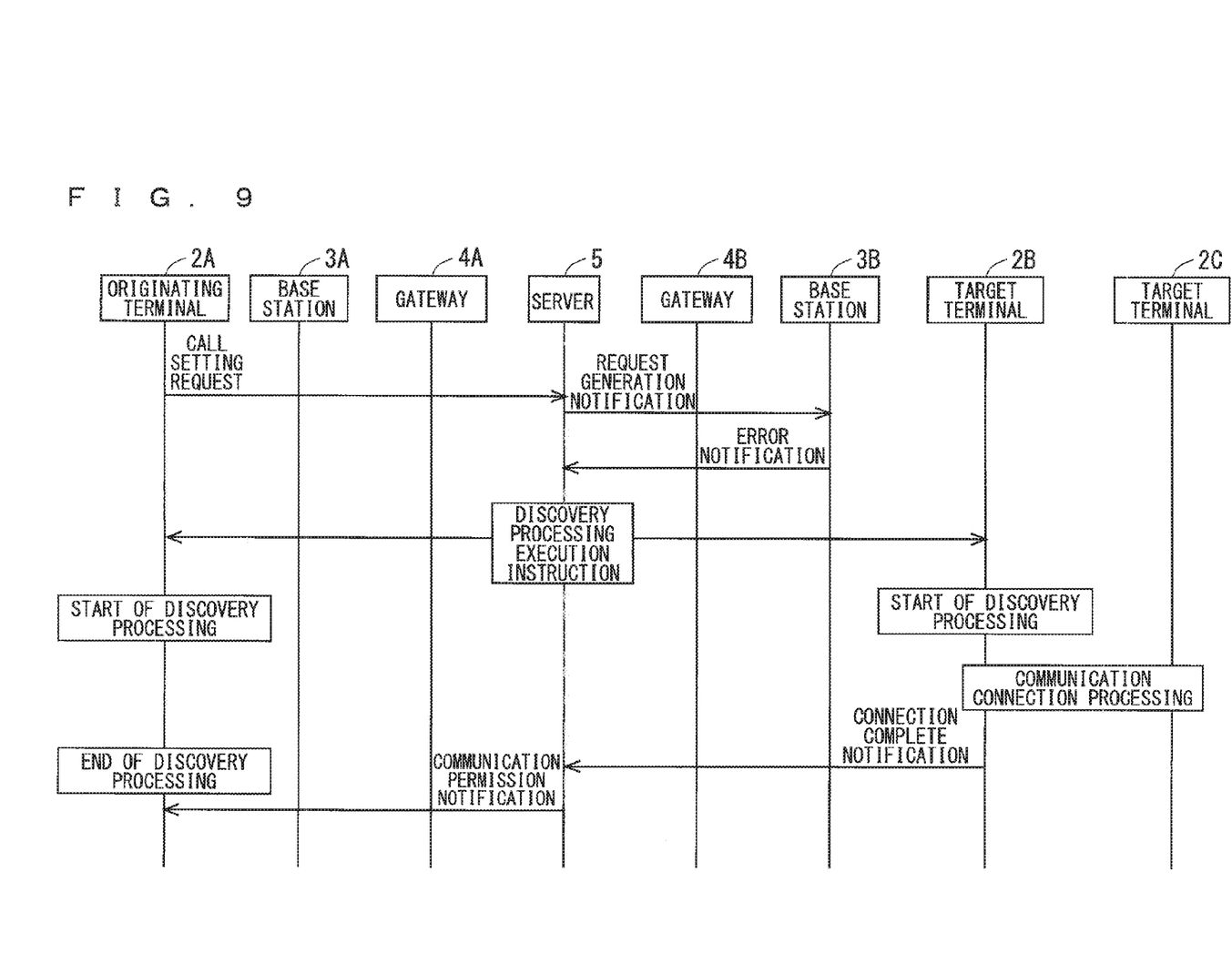
FIG. 9 illustrates a modification of the operation of the communication system.

The originating terminal 2 determines to provide the communication terminal 2 included in the PTT group with the instruction to execute the discovery processing in the example above, which may be determined by the server apparatus 5. FIG. 9 illustrates the operation of the communication system 1 in this case. FIG. 9 illustrates the operation of the communication system 1 in a situation illustrated in FIG. 7, as in FIG. 6. The operation of the communication system 1 until the server apparatus 5 receives, from the base station 3B, an error notification indicating that a communication with the target terminal 2C cannot be performed is as in FIG. 6.

In the server apparatus 5, upon receipt of an error notification from the base station 3B, the controller 51 determines on its own to provide the communication terminal 2 included in the PTT group with the instruction to execute the discovery processing without receiving any instruction from another apparatus such as a communication terminal 2. The controller 51 functions as a determination unit that determines to provide a communication terminal 2 included in the PTT group with the instruction to execute the discovery processing. The server apparatus 5 then transmits a discovery processing execution instruction to each of a plurality of communication terminals 2 forming a PTT group through the gateway apparatus 4 and the base station 3. The operation of the communication system 1 after the server apparatus 5 transmits a discovery processing execution instruction is as in FIG. 6.

When the server apparatus 5 determines on its own to provide the communication terminal 2 included in the PTT group with the instruction to execute the discovery processing as described above, the processing in the originating terminal 2 can be simplified, and also, the server apparatus 5 can transmit a discovery processing execution instruction immediately.

While the communication system 1 has been shown and described in detail, the foregoing description is in all aspects illustrative and not restrictive. Also, the variations above are applicable in combination as long as they are consistent with each other. It is therefore understood that numerous modifications and variations can be devised without departing from the scope of the invention.

The invention claimed is:

1. A server apparatus that controls a communication terminal, the apparatus comprising:
   a receiver; and
   a transmitter,
   wherein
   a plurality of communication terminals forming a group are capable of performing a push-to-talk group communication through the server apparatus,
   in reception of a call setting request from a first communication terminal included in the group by the receiver, when the group includes a second communication terminal to which call setting fails, the transmitter transmits, to a communication terminal included in the group, an instruction to execute a discovery processing of discovering a communication partner terminal capable of performing a direct communication with the communication terminal without passing through the server apparatus, and
   when a result of the discovery processing reveals that a third communication terminal that has received the instruction from the server apparatus is capable of performing the direct communication with the second communication terminal, call setting between the server apparatus and the second communication terminal is performed through the third communication terminal.

2. The server apparatus according to claim 1, further comprising
   at least one processor configured to determine on its own to provide the communication terminal included in the group with the instruction when the group includes the second communication terminal.

3. The server apparatus according to claim 1, wherein the transmitter transmits the instruction to each of the communication terminals of the group when the group includes the second communication terminal.

4. The server apparatus according to claim 1, wherein
   the transmitter communicates with a communication terminal through a base station, and
   when the group includes the second communication terminal, the transmitter transmits the instruction to only a communication terminal communicable with a base station with which the second communication terminal communicated last in the group.

5. A communication apparatus that is a communication terminal of a plurality of communication terminals that communicate with a server apparatus, the apparatus comprising:
   a transmitter; and
   a receiver,
   wherein
   the communication apparatus forms, together with another communication terminal, a group capable of performing a push-to-talk group communication through the server apparatus,
   in transmission of a call setting request to the server apparatus from a first communication terminal included in the group, when the group includes a second communication terminal to which call setting fails, the server apparatus transmits, to a communication terminal included in the group, an instruction to execute a discovery processing of discovering a communication partner terminal capable of performing a direct communication with the communication terminal without passing through the server apparatus, and when a result of the discovery processing reveals that the communication apparatus in which the receiver has received the instruction from the server apparatus is capable of performing the direct communication with the second communication terminal, call setting between the server apparatus and the second communication terminal is performed through the communication apparatus.

6. A communication apparatus that is a communication terminal of a plurality of communication terminals that communicate with a server apparatus, the apparatus comprising:

a transmitter; and a receiver;

wherein the communication apparatus forms, together with another communication terminal, a group capable of performing a push-to-talk group communication through the server apparatus, in transmission of a call setting request to the server apparatus from the transmitter, when the group includes a first communication terminal to which call setting fails, the server apparatus notifies the communication apparatus that the group includes a communication terminal to which call setting fails, the communication apparatus further comprises at least one processor configured to determine, when the server apparatus notifies the receiver that the group includes the communication terminal to which call setting fails, to provide a communication terminal included in the group with an instruction to execute a discovery processing of discovering a communication partner terminal capable of performing a direct communication with the communication terminal without passing through the server apparatus, when the at least one processor determines the instruction, the server apparatus provides the communication terminal included in the group with the instruction, and when a result of the discovery processing reveals that a second communication terminal that has received the instruction from the server apparatus is capable of performing the direct communication with the first communication terminal, call setting between the server apparatus and the first communication terminal is performed through the second communication terminal.

7. A communication apparatus that is a communication terminal of a plurality of communication terminals that communicate with a server apparatus, the apparatus comprising:

a transmitter; and a receiver, wherein the communication apparatus forms, together with another communication terminal, a group capable of performing a push-to-talk group communication through the server apparatus, in transmission of a call setting request to the server apparatus from a first communication terminal included in the group, when call setting to the communication apparatus fails, the server apparatus transmits, to a communication terminal included in the group, an instruction to execute a discovery processing of discovering a communication partner terminal capable of performing a direct communication with the communication terminal without passing through the server apparatus, and when a result of the discovery processing reveals that a second communication terminal that has received the instruction from the server apparatus is capable of performing the direct communication with the communication apparatus, call setting between the server apparatus and the communication apparatus is performed through the second communication terminal.

8. A communication method for use in a push-to-talk group communication by a plurality of communication terminals forming a group through a server apparatus, the method comprising:

(a) transmitting a call setting request by a first communication terminal included in the group;

(b) after the step (a), when the group includes a second communication terminal to which call setting fails, receiving, by a third communication terminal included in the group, from the server apparatus an instruction to execute a discovery processing of discovering a communication terminal capable of performing a direct communication with the third communication terminal without passing through the server apparatus; and (c) when a result of the discovery processing reveals that the third communication terminal that has received the instruction is capable of performing the direct communication with the second communication terminal, performing call setting between the server apparatus and the second communication terminal through the third communication terminal.

* * * * *